United States Patent
Banadaki et al.

(10) Patent No.: US 9,596,295 B2
(45) Date of Patent: Mar. 14, 2017

(54) COMPUTING CONNECTED COMPONENTS IN LARGE GRAPHS

(71) Applicant: GOOGLE INC., Mountain View, CA (US)

(72) Inventors: Seyed Vahab Mirrokni Banadaki, New York, NY (US); Raimondas Kiveris, Jersey City, NJ (US); Vibhor Rastogi, Mountain View, CA (US); Silvio Lattanzi, New York, NY (US); Sergei Vassilvitskii, San Francisco, CA (US)

(73) Assignee: Google Inc., Mountain View, CA (US)

( * ) Notice: Subject to any disclaimer, the term of this patent is extended or adjusted under 35 U.S.C. 154(b) by 577 days.

(21) Appl. No.: 14/143,894

(22) Filed: Dec. 30, 2013

(65) Prior Publication Data
US 2015/0006619 A1    Jan. 1, 2015

Related U.S. Application Data

(60) Provisional application No. 61/841,337, filed on Jun. 29, 2013.

(51) Int. Cl.
  *G06F 17/00* (2006.01)
  *H04L 29/08* (2006.01)
  (Continued)

(52) U.S. Cl.
  CPC ............ *H04L 67/10* (2013.01); *G06F 9/5066* (2013.01); *G06F 9/546* (2013.01); *G06Q 10/06* (2013.01)

(58) Field of Classification Search
  CPC ................ G06F 9/5066; H04L 67/10
  (Continued)

(56) References Cited

U.S. PATENT DOCUMENTS 7,761,448 B2  7/2010  Meyerzon et al.
8,631,094 B1  1/2014  Alpert et al.
(Continued)

FOREIGN PATENT DOCUMENTS

WO    2007/041120 A1    4/2007

OTHER PUBLICATIONS

Banerjee, et al, "Hybrid algorithms for list ranking and graph connected component", 18th International Conference on High Performance Computing, Dec. 18, 2011, 10 pages.
(Continued)

*Primary Examiner* — David Vincent
(74) *Attorney, Agent, or Firm* — Brake Hughes Bellermann LLP

(57) ABSTRACT

Systems and methods for improving the time and cost to calculate connected components in a distributed graph are disclosed. One method includes reducing a quantity of map-reduce rounds used to determine a cluster assignment for a node in a large distributed graph by alternating between two hashing functions in the map stage of a map-reduce round and storing the cluster assignment for the node in a memory. Another method includes reducing a quantity of messages sent during map-reduce rounds by performing a predetermined quantity of rounds to generate, for each node, a set of potential cluster assignments, generating a data structure in memory to store a mapping between each node and its potential cluster assignment, and using the data structure during remaining map-reduce rounds, wherein the remaining map-reduce rounds do not send messages between nodes. The method can also include storing the cluster assignment for the node in a memory.

20 Claims, 11 Drawing Sheets

(51) Int. Cl.
*G06F 9/50* (2006.01)
*G06F 9/54* (2006.01)
*G06Q 10/06* (2012.01)

(58) Field of Classification Search
USPC .................................................... 706/12, 45
See application file for complete search history.

(56) References Cited

U.S. PATENT DOCUMENTS

| | | |
|---|---|---|
| 2003/0033582 A1 | 2/2003 | Klein et al. |
| 2005/0073962 A1 | 4/2005 | Zabele et al. |
| 2005/0088965 A1 | 4/2005 | Atlas et al. |
| 2007/0297332 A1 | 12/2007 | Broberg et al. |
| 2008/0288580 A1 | 11/2008 | Wang et al. |
| 2009/0007127 A1 | 1/2009 | Roberts et al. |
| 2009/0210489 A1 | 8/2009 | Deb et al. |
| 2009/0316697 A1 | 12/2009 | Dakshinamoorthy et al. |
| 2010/0017368 A1 | 1/2010 | Mao et al. |
| 2010/0083194 A1 | 4/2010 | Bagherjeiran et al. |
| 2010/0241828 A1* | 9/2010 | Yu ........................... G06F 8/456 712/30 |
| 2011/0066649 A1 | 3/2011 | Berlyant et al. |
| 2013/0024479 A1* | 1/2013 | Gong .................... G06F 9/5066 707/798 |
| 2013/0086356 A1* | 4/2013 | Narang ................. G06F 9/5066 712/30 |
| 2013/0346988 A1* | 12/2013 | Bruno ................... G06F 9/5066 718/102 |

OTHER PUBLICATIONS

Gazit, "An optimal randomized parallel algorithm for finding connected components in a graph", 27th Annual Symposium on Foundations of Computer Science, Oct. 27, 1986, 10 pages.
Nuutila, et al, "On finding the strongly connected components in a directed graph", Information Processing Letters, vol. 49 No. 1, Jan. 14, 1994, pp. 9-14.
Koubek, et al, "Parallel algorithms for connected components in a graph", Fundamentals of Computation Theory, Sep. 9, 1985, pp. 208-217.
International Search Report and Written Opinion for PCT Application No. PCT/US2014/044636, mailed Oct. 30, 2014, 14 pages.
Rastogi, et al., "Finding Connected Components in Map-Reduce in Logarithmic Rounds", ICDE Conference 2013, pp. 50-61.
Abramowski, et al, "Searching connected components in very large grid graphs", Graph-Theoretic Concepts in Computer Science, Jun. 17, 1986, pp. 118-130.
Seidl, et al, "CC-MR Finding Connected Components in Huge Graphs with Map Reduce", ECML PKDD 2012, Part 1, LNCS 7523, 2012, pp. 458-473.

Afrati et al., "Map-Reduce Extensions and Recursive Queries", EDBT, ACM, Mar. 22-24, 2011, 8 pages.
Chakrabarti et al., "R-Mat: A Recursive Model for Graph Mining", In Fourth Siam Lmemational Conference On Data Mining (SDM), 2004, 5 pages.
Chang et al., "Bigtable: A Distributed Storage System for Structured Data", In OSD/'06: Seventh Symposium on Operating System Design and Implementation, Google, Inc., 2006, 14 pages.
Suri, et al., "Counting Triangles and the Curse of the Last Reducer", Proceedings of the 20th international conference on World wide web, Mar. 28-Apr. 1, 2011, pp. 607-614.
Cohen, "Graph Twiddling in a MapReduce World", Computing in Science and Engineering, 11(4), Jul. 2009, pp. 29-41.
Valiant, et al., "A Bridging Model for Parallel Computation", Communications of the ACM, vol. 33 Issue 8, Aug. 1990, pp. 103-111.
Goodrich et al., "Sorting, Searching, and Simulation in the Map Reduce Framework", Lecture Notes in Computer Science, vol. 7074, 2011, 374-383 pages.
Johnson et al., "Connected Components in O(log3/2n) Parallel Time for the CREW PRAM", J. Comput. Syst. Sci., 54(2), 1997, 43 pages.
Kang et al., "PEGASUS: A Peta-Scale Graph Mining System Implementation and Observations", The Ninth IEEE International Conference on Data Mining, Dec. 6-9, 2009, pp. 229-238.
Karger et al., "Fast Connected Components Algorithms for the EREW Pram", Proceeding SPAA '92 Proceedings of the Fourth Annual ACM Symposium on Parallel Algorithms and Architectures, 1992, pp. 373-381.
Karloff et al., "A Model of Computation for MapReduce", Proceeding SODA '10 Proceedings of the Twenty-First Annual ACM-SIAM Symposium on Discrete Algorithms, 2010, pp. 938-948.
Krishnamurthy et al., "Connected Components on Distributed Memory Machines", In Parallel Algorithms: 3rd DIMACS Implementation Challenge, 1994, 21 pages.
Kwak et al., "What is Twitter, A Social Network or a News Media?", Proceedings of the 19th International Conference on World Wide Web, Apr. 26-30, 2010, pp. 591-600.
Low et al., "Distributed GraphLab: A Framework for Machine Learning and Data Mining in the Cloud", Proceedings of the VLDB Endowment, vol. 5 Issue 8, Apr. 2012, pp. 716-727.
Malewicz et al., "Pregel: A System for Large-Scale Graph Processing", Proceedings of the 2010 ACM SIGMOD International Conference on Management of Data, 2010, pp. 135-146.
Plimpton et al., "Mapreduce In MPI for Large-Scale Graph Algorithms", Parallel Computing, vol. 37, Issue 9, Sep. 2011, pp. 610-632.
Rastogi et al., "Finding Connected Components in Map-Reduce in Logarithmic Rounds", Data Engineering (ICDE), 2013 IEEE 29th International Conference, Apr. 8-12, 2013, pp. 50-61.
Seidl, et al., "CC-MR—Finding Connected Components in Huge Graphs with MapReduce", EMCL PKDD 2012, Part I, LNCS 7523, 2012, 16 pages.

* cited by examiner

1: Input: A graph $G = (V, E)$,
   *hashing* function $h$
   *merging* function $m$, and
   *export* function EXPORT
2: Output: A set of connected components $C \subset 2^V$
3: Either Initialize $C_v = \{v\}$ Or $C_v = \{v\} \cup nbrs(v)$ depending on the algorithm.
4: repeat
5:   mapper for node $v$:
6:   Compute $h(C_v)$, which is a collection of key-value pairs $(u, C_u)$ for $u \in C_v$.
7:   Emit all $(u, C_u) \in h(C_v)$.
8:   reducer for node $v$:
9:   Let $\{C_v^{(1)}, \ldots, C_v^{(K)}\}$ denote the set of values received from different mappers.
10:  Set $C_v \leftarrow m(\{C_v^{(1)}, \ldots, C_v^{(K)}\})$
11: until $C_v$ does not change for all $v$
12: Return $C = \text{EXPORT}(\cup_v \{C_v\})$

FIG. 5

COMPUTING CONNECTED COMPONENTS IN LARGE GRAPHS

RELATED APPLICATIONS

This application claims priority under 35 U.S.C. §119 to Provisional Patent Application Ser. No. 61/841,337, entitled "COMPUTING CONNECTED COMPONENTS IN LARGE GRAPHS" filed on Jun. 29, 2013. The subject matter of this earlier filed application is hereby incorporated by reference.

DISCLOSURE

Graphs are a basic modeling tool to model social, communication, and information networks. A graph G(V, E) consists of a set of nodes V, and a set of edges E$\in V^2$ where each edge connects two nodes in the graph. In many applications, analysis is performed on large graphs that do not fit on one machine. Consequently, the graph is stored in several machines and mined in a distributed manner, for example by applying distributed programming tools like Map-Reduce or Hadoop. A basic analysis tool for graphs is to compute connected components of the graph. A connected component of a graph G(V,E) is a maximal set of nodes that can be reached from each other via sequences of edges of the graph. Computing connected components of graph G results in a partitioning of the nodes V into one of several clusters, where each cluster is a connected component. For example, FIG. 2 illustrates a graph G with three connected components. Connected component 205 includes nodes A, B, C, and D, connected component 210 includes nodes F, G, I, and H, and connected component 215 includes nodes J, K, L, and M. The connected components may also be referred to as a cluster of nodes.

Computing connected components in graphs is a basic tool for computing coherent clusters of nodes and also to perform hierarchical clustering. But computing clusters of nodes distributed across multiple machines can be time and cost prohibitive as the running time of the hashing functions are dependent on the size of the graph, the number of messages sent between machines during the rounds of Map-Reduce, and the number of rounds of Map-Reduce performed. It is a challenge is to compute connected components for a large graph.

SUMMARY

Implementations provide two methods of improving the time and cost to calculate connected components in a large distributed graph. The first method alternates rounds of Map-Reduce between Hash-Greater-to-Min and Hash-Lesser-to-Min functions. Alternating the functions used in each round of Map-Reduce results in computing times 2 to 4.5 times faster than using Hash-to-Min in each round on a graph with 10-500 billion edges. The second method reduces the number of messages sent by performing a predetermined number of rounds of Map-Reduce and finishing the Map-Reduce using a table in memory. For example, after the predetermined number of rounds, for example 2, a table in memory is created that represents the still active cluster identifiers and their associated nodes. The remaining rounds of Map-Reduce, which will reduce the active cluster identifiers to actual cluster identifiers, can be performed using the table, which eliminates messaging between nodes and machines. Using the memory table after a predetermined number of rounds results in computing times 4.5 to 15 times faster than without the table. Another implementation optimizes the alternating with load-balancing highly connected nodes, reducing the maximum number of values a reducer node receives.

One aspect of the disclosure can be embodied in a system that includes distributed computing devices, memory storing a graph of nodes and edges, the graph being distributed across the computing devices and at least one root computing device. The root computing device includes at least one processor and memory storing instructions that, when executed by the at least one processor, cause the system to determine connected components for the graph by performing rounds of a map stage and a reduce stage for the nodes of the graph, wherein the map stage alternates between two hashing functions. The graph can include more than one billion nodes.

The system can include one or more of the following features, for example, a first hashing function of the two hashing functions may be a Hash-Greater-to-Min hashing function that emits ($V_{min}$, $C_{>V}$) and (U, $\{V_{min}\}$) for nodes U in the set of $C_{>V}$ and a second hashing function of the two hashing functions is a Hash-Lesser-to-Min hashing function that emits ($V_{min}$, $C_{\leq V}$) and (U, $\{V_{min}\}$) for nodes U in the set of $C_{\geq V}$. In another example, determining the connected components may include load balancing nodes with a neighborhood size larger than a bounded limit during a first of the two hashing functions.

As another example, the system may also include memory storing a state for a first node of nodes, the state including a set of possible cluster identifiers, and a first hashing function of the two hashing functions can include determining a minimum cluster identifier in the set of possible cluster identifiers, determining a first subset of the cluster identifiers, sending a message with the minimum cluster identifier to nodes corresponding to the first subset, and sending a message that includes the first subset of cluster identifiers to a node associated with the minimum cluster identifier. In such implementations, a second hashing function of the two hashing functions can include determining a minimum cluster identifier in the set of possible cluster identifiers, determining a second subset of the cluster identifiers, the second subset including the cluster identifiers not included in the first subset, sending a message with the minimum cluster identifier to nodes corresponding to the second subset, and sending a message that includes the second subset of cluster identifiers to a node associated with the minimum cluster identifier.

Another aspect of the disclosure can be embodied in a method that includes reducing processing time during map-reduce rounds used to determine a cluster assignment for a node in a large distributed graph, a map-reduce round including a map stage and a reduce stage, the processing time being reduced by alternating between two hashing functions in the map stage and storing the cluster assignment for the node in a memory. A first of the two hashing functions may be a Hash-Greater-to-Min hashing function and a second of the two hashing functions may be a Hash-Lesser-to-Min hashing function.

Another aspect of the disclosure can be embodied in a method that includes reducing a quantity of messages sent during map-reduce rounds used to determine a cluster assignment for a node in a large distributed graph by; 1) performing a predetermined quantity of rounds to generate, for each node, a set of potential cluster assignments, 2) generating a data structure in memory to store a mapping between each node and its potential cluster assignment, and 3) using the data structure during remaining map-reduce rounds, wherein the remaining map-reduce rounds do not use messages sent between nodes. The method may also include storing the cluster assignment for the node in a memory. The data structure may be an SSTable or a Bigtable.

Another aspect of the disclosure can be embodied in a system that includes distributed computing devices represented by leaf servers, memory storing a graph of nodes and edges, the graph being distributed across the leaf servers, and at least one root computing device. The root computing device includes at least one processor and memory storing instructions that, when executed by the at least one processor, cause the system to determine connected components for the graph. The system determines connected components by performing a predetermined number of rounds of a map stage and a reduce stage for the nodes of the graph, the map stage causing messages to be sent between the leaf servers, and wherein performing the predetermined number of rounds generates a set of potential clusters for each node, generating a data structure in memory to store a mapping between each node and its set of potential clusters, and using the data structure during remaining rounds of the map stages and the reduce stages, wherein no messages are sent between the leaf servers during the remaining rounds. The map stage may use a Hash-to-Min hashing function.

Another aspect of the disclosure can be embodied on a computer-readable medium having recorded and embodied thereon instructions that, when executed by a processor of a computer system, cause the computer system to perform any of the methods disclosed herein.

The details of one or more implementations are set forth in the accompanying drawings and the description below. Other features will be apparent from the description and drawings, and from the claims.

BRIEF DESCRIPTION OF DRAWINGS

FIG. 5 shows an example of a general Map-Reduce function.

Like reference symbols in the various drawings indicate like elements.

DETAILED DESCRIPTION

Figure 1:
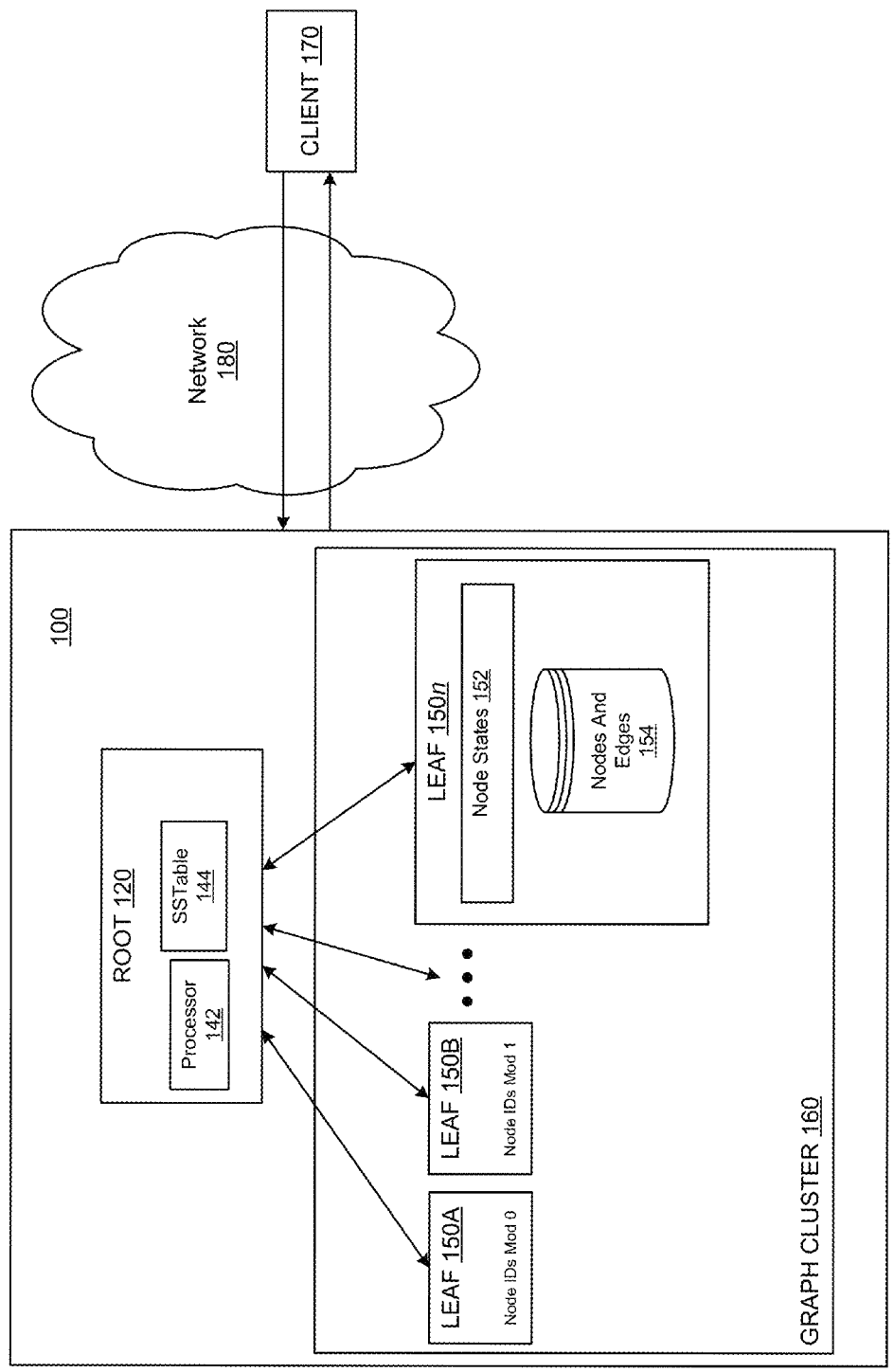
FIG. 1 illustrates an example system in accordance with the disclosed subject matter.
Figure 11:
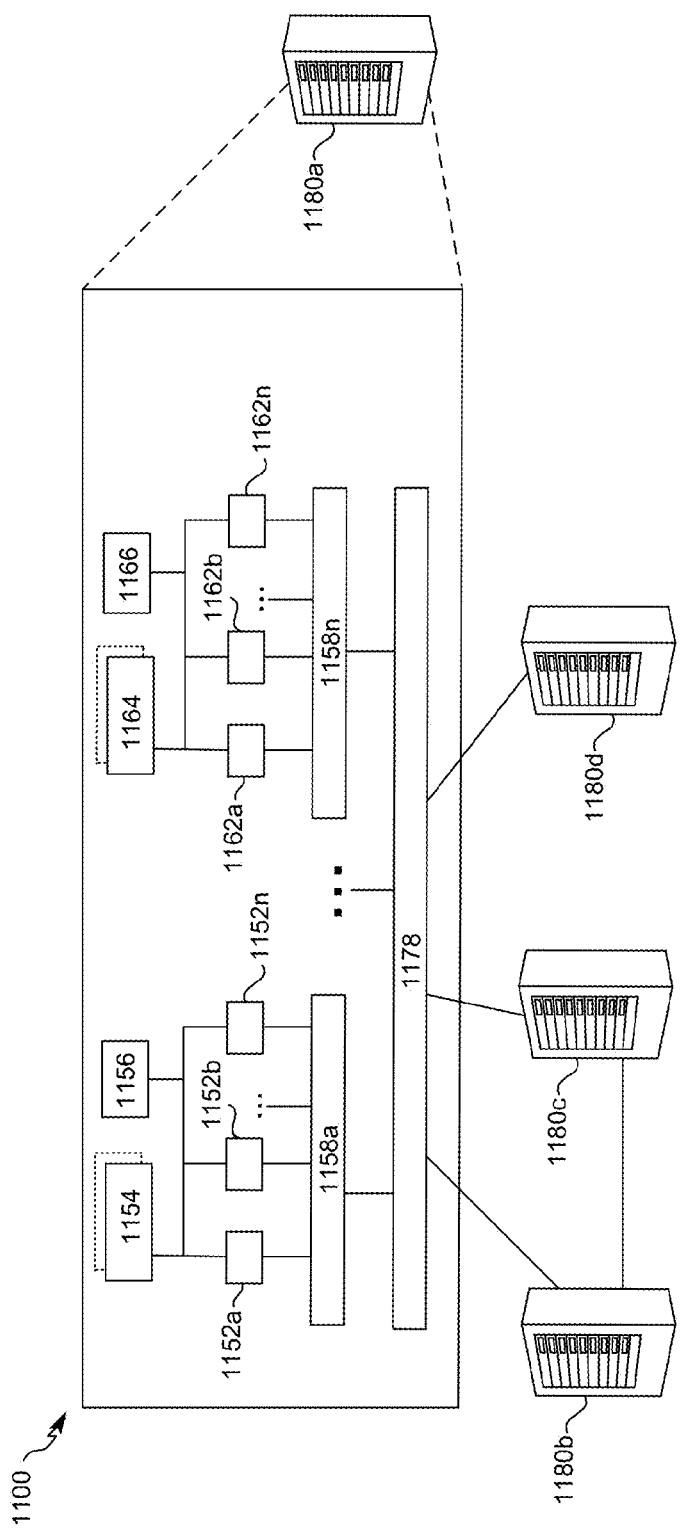
FIG. 11 shows an example of a distributed computer device that can be used to implement the described techniques.

FIG. 1 is a block diagram of a distributed graph system 100 in accordance with an example implementation. The system 100 may be used to calculate connected components of a large distributed graph using the techniques described herein. The graph system 100 may include root 120 and graph cluster 160. Root 120 and graph cluster 160 may be computing devices that take the form of a number of different devices, for example a standard server, a group of such servers, or a rack server system. In some implementations, the root 120 and the graph cluster 160 may be distributed systems implemented in a series of computing devices, such as a group of servers. In some implementations, the servers may be organized into a tree structure, with at least a root server 120 and leaf servers 150A to 150n. In some implementations (not shown), the tree may include intermediate servers, so that there are one or more layers between the root 120 and the leaf servers 150A to 150n. The root 120 and graph cluster 160 may be examples of computer device 1100, as depicted in FIG. 11.

The graph system 100 illustrated in FIG. 1 operates over a large graph with, for example, billions of nodes. The root 120 may include one or more hardware processors 142 for one or more computing devices, such as servers, that operate with the graph cluster 160 to perform operations on the data graph represented by nodes and edges 154. The root 120 may include one or more servers that receive commands or requests from a requester, such as client 170. The root 120 may initiate and monitor calculations performed on the graph and may manage the results of the calculations. In some implementations, the root 120 may facilitate searches and queries on the graph. The root 120 may also store a memory table, such as SSTable 144, that can be used to reduce the number of messages sent during later rounds of a Map-Reduce process.

System 100 may also include a graph cluster 160. Graph cluster 160 may be a collection of distributed computing devices each with its own hardware processor and memory. The number of computing devices that comprise graph cluster 160 can vary. The graph cluster 160 may be divided into one or more leaf servers, such as leaf 150A, leaf 150B, leaf 150n, with n representing any positive integer. A leaf server may be associated with a logical division of nodes in the graph, with each graph node being assigned to a leaf server. Thus, a leaf server may correspond to one computing device, or a leaf server may be a logical computing device and may share a physical computing device with other leaves. In some implementations, a node's assigned leaf may change as the graph is updated, making leaf assignments flexible. The root 120 may determine which nodes are assigned to each leaf as the nodes are added to the graph or updated.

The root 120 may route processing requests to the leaf servers and act as the primary means of coordination between the leaves at processing time. Of course, leaves may send messages directly to each other, and nodes in the graph may send messages to each other as part of graph processing. In addition to the leaf servers, the graph cluster 160 may include one or more layers or intermediate servers between the root node 120 and the leaf servers, but are not shown in FIG. 1 for the sake of brevity. Thus, for example, an intermediate server may be associated with, for example, 20 leaf servers. The intermediate server may be connected directly to the root, or there may be one or more additional layers between the intermediate server and the root 120. Thus, although FIG. 1 shows communications directly between the root and leaf servers, it is to be understood that intermediate devices may be used to direct communications and aggregate results using known methods, such as remote procedure calls. The root, intermediate, and leaf servers that make up the tree may, collectively, be referred to as the graph.

Each of the leaf servers that make up graph cluster 160 can include node states 152 and nodes and edges 154. A state for a node may be used in calculating connected components for the graph and may indicate the cluster of nodes ($C_v$) that a node belongs to. During the calculation of connected components, the cluster $C_v$ may include a set of node identifiers, but at the conclusion of the calculation the $C_v$ for each node will include one identifier. This identifier becomes the identifier for the cluster and, accordingly, the identifier for the component the node belongs to. The state, or set of nodes in $C_v$ may be altered during each round of Map-Reduce.

Graph system 100 may be in communication with clients 170 over network 180. Network 180 may be for example, the Internet or the network 180 can be a wired or wireless local area network (LAN), wide area network (WAN), etc., implemented using, for example, gateway devices, bridges, switches, and/or so forth. Via the network 180, the system 100 may communicate with and transmit data to/from clients 170 or other computing devices.

Figure 2:
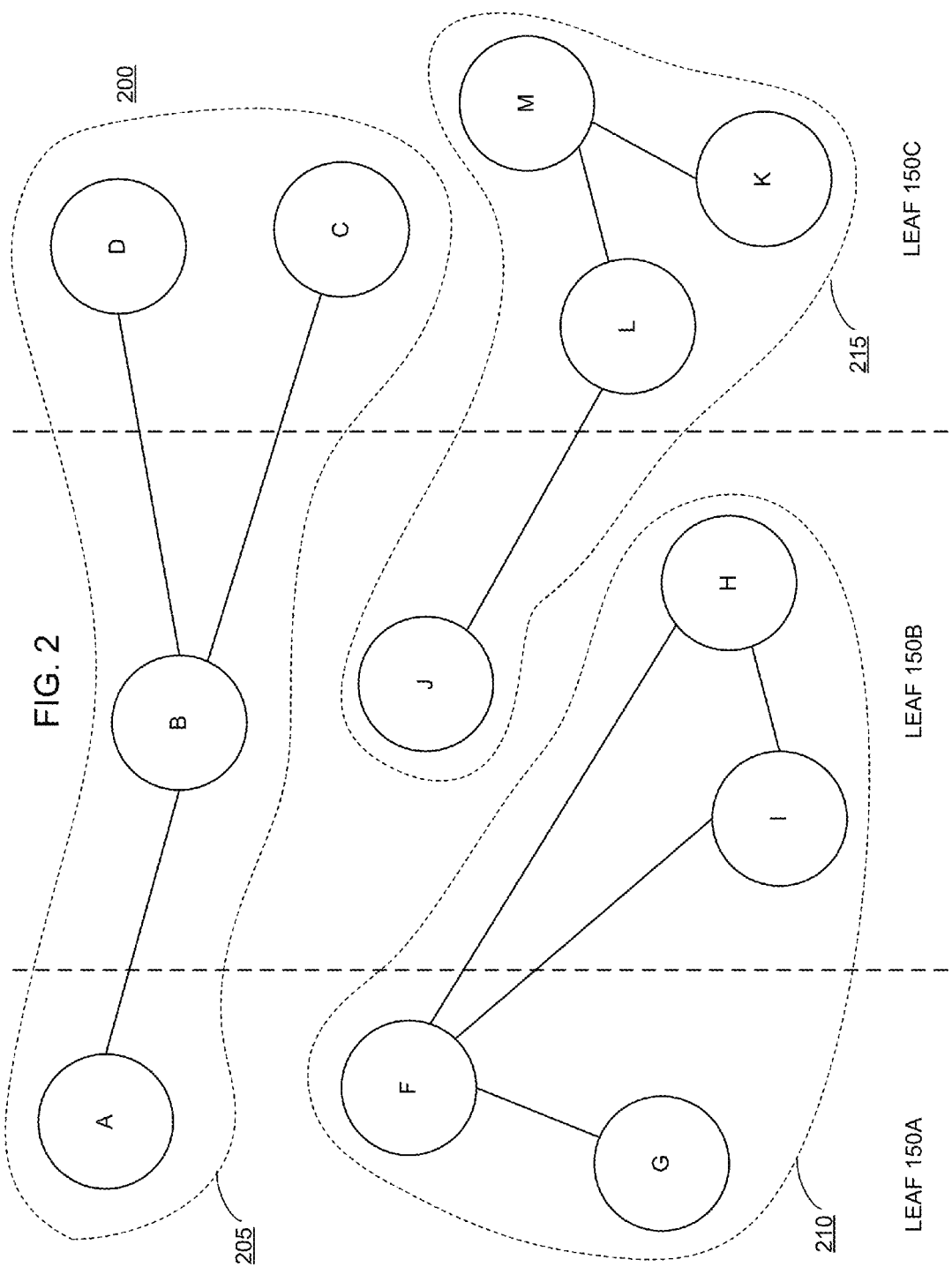
FIG. 2 illustrates an example graph distributed across three leaves and including three clusters.
Figure 3:
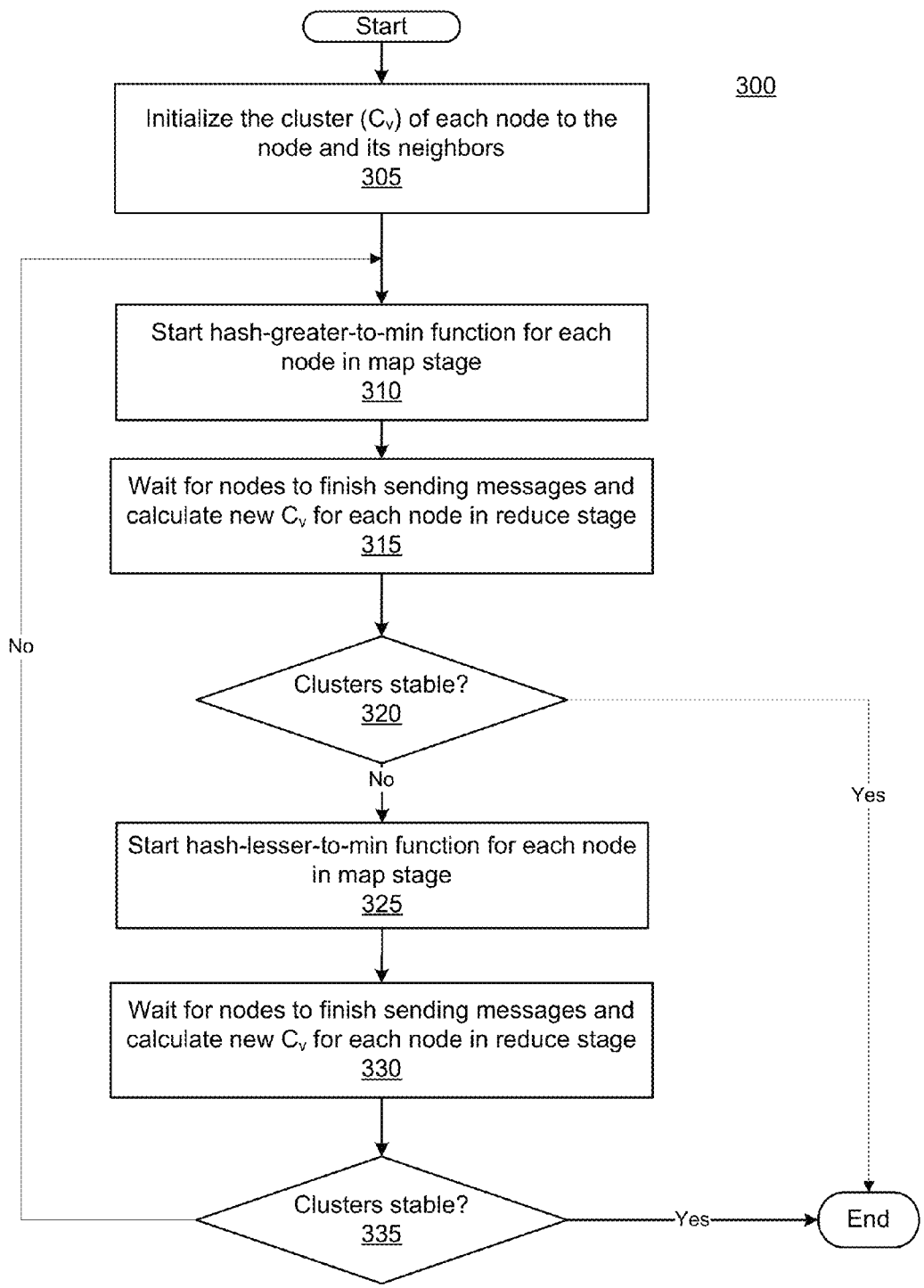
FIG. 3 illustrates a flow diagram of an example process for computing connected components of a large distributed graph.

FIG. 3 illustrates a flow diagram of an example process 300 for computing connected components of a large distributed graph. The process 300 shown in FIG. 3 may be performed by a graph system distributed across multiple computing devices, such as graph system 100 of FIG. 1. The process 300 may speed the calculation of connected components in a distributed graph by using an alternating algorithm for Map-Reduce rounds to calculate the cluster each node belongs to. A root, such as root 120, may initiate process 300 to determine which cluster the nodes belong to. The process may begin with the system initializing the cluster $C_v$ for each node in the graph. $C_v$ is the state of a node and includes a set of possible clusters the node is a member of. Before the calculation begins, each node in the graph may be considered a cluster, e.g., a cluster with a single member. The reduce stage of the Map-Reduce rounds will shrink the number of clusters, so that after each round there are fewer possible clusters. Process 300 ends when each node is a member of one possible cluster, or in other words when the $C_v$ for each V in the graph does not change. The node with the smallest identifier ($V_{min}$) in the cluster may be used to identify the cluster, as will be illustrated below. Thus, the identifier of $V_{min}$ in the cluster may be the cluster identifier. In this sense, members of $C_v$ may also represent nodes in the graph. To initialize $C_v$ for a node V, the system may set $C_v$ to the set of V and the neighbors of V. For example, in the graph of FIG. 2, the system initializes $C_A$ to {A, B}, $C_B$ to {A, B, D, C}, $C_C$ to {B, C}, and $C_D$ to {B, D}.

The system then begins the first round of Map-Reduce with a map stage performing a Hash-Greater-to-Min hashing function at each node (310). In a Hash-Greater-to-Min hashing function, the set of members of $C_v$ that are greater than V are sent via a message to the reducer node $V_{min}$ and the set {$V_{min}$} is sent via a message to all reducer nodes U in $C_v$ that are greater than V ($C_{>V}$). In other words, the Hash-Greater-to-Min hashing function emits ($V_{min}$, $C_{>V}$) and (U, {$V_{min}$}) for nodes U in the set of $C_{>V}$. For example, using the graph of FIG. 2:

Node A sends {A} to node B and {B} to itself;
Node B sends {A} to Nodes C and D and {C, D} to node A;
Node C sends { } (empty set) to Node B;
Node D sends { } to Node B.

Nodes C and D send empty sets because there are no nodes greater than themselves in their corresponding potential clusters, $C_C$ and $C_D$. Messages may be sent between nodes using any now known or later discovered method, including remote procedure calls. It is understood that some of these messages may travel between leaves. For example, for Node I of FIG. 2 to send a message to Node F, the message is sent between Leaf 150B and Leaf 150A but a message sent to Node H can be sent within Leaf 150B.

Process 300 continues with the nodes calculating a new $C_v$ (315), either as messages are received or after all nodes are finished sending messages in the reduce stage. If the node calculates $C_v$ as messages are received, the node may still wait to proceed to the next Map-Reduce round because Map-Reduce rounds are synchronized. In other words, in each found of Map-Reduce the nodes begin the map stage together. The new $C_v$ may be a union of the sets received from other nodes. Accordingly in the example of FIG. 2, the new $C_A$ is {B, C, D}, the new $C_B$ is {A}, the new $C_C$ is {A}, and the new $C_D$ is {A}. After a new $C_v$ is calculated for each reducer node, or the nodes that received a message, the first round of Map-Reduce is complete.

The system may determine whether the clusters are stable (320). The clusters are stable if no node V had a change $C_v$ during the last round. If no node V changed its $C_v$ the clusters are stable (320, Yes), and process 300 ends. Otherwise, another round of Map-Reduce begins with another map stage. In this round, the system uses a Hash-Lesser-to-Min hashing function (325). In Hash-Lesser-to-Min, the set of members of $C_v$ that are less than V are sent via a message to a reducer node $V_{min}$ and the set {$V_{min}$} is sent via a message to all reducer nodes U in $C_v$ that are less than or equal to V ($C_{\leq V}$). In other words, the Hash-Lesser-to-Min hashing function emits ($V_{min}$, $C_{\leq V}$) and (U, {$V_{min}$}) for nodes U in the set of $C_{\leq V}$. For example, using the graph of FIG. 2:

Node A sends {B} to itself;
Node B sends {A} to Node A;
Node C sends {A} to Node A;
Node D sends {A} to Node A.

Process 300 continues with the nodes calculating a new $C_v$ (330), as explained above with regard to step 315. When the new $C_v$ for each reducer node is calculated, the reduce stage of the round is complete, so the second round of Map-Reduce is complete. Continuing with the example of FIG. 2, the new $C_A$ is {A, B}. Note that nodes B, C and D did not receive messages and, thus, are not reducer nodes for this round. Of course, their $C_v$ does not change but remains {A}.

The system then determines again whether the clusters are stable (335). If so (335, Yes), process 300 ends. If not (335, No), another round of Map-Reduce begins. Because the Hash function alternates in each round, the system will start a Hash-Greater-to-Min function in each node, as described above with regard to steps 310 to 320. The rounds continue, alternating between Hash-Greater-to-Min and Hash-Lesser-to-Min until the clusters are stable.

Of course, in the discussion of FIG. 3 above using the example of FIG. 2, only processing within cluster 205 was discussed for the sake of brevity. It is understood that all nodes in the graph would perform the rounds of Map-Reduce together, and that the process continues until each cluster in the graph is stable. Thus, nodes F, G, H, I, J, K, L, and M would also be involved in each round of Map-Reduce discussed above and the clusters would not be stable until none of the $C_v$ in the graph change during the reduce stage.

At the end of process 300, the state or $C_v$ of each node contains one member, representing the cluster that the node belongs to. This cluster identifier may represent one of the connected components for the graph. In some implementations, the cluster identifier may be stored as a property of the node. The clusters may be used for various graph processing tasks such as suggesting new connections in a social networking graph or load distribution for traffic in a computer network graph.

Optimizing Using an In-Memory Table

Figure 4:
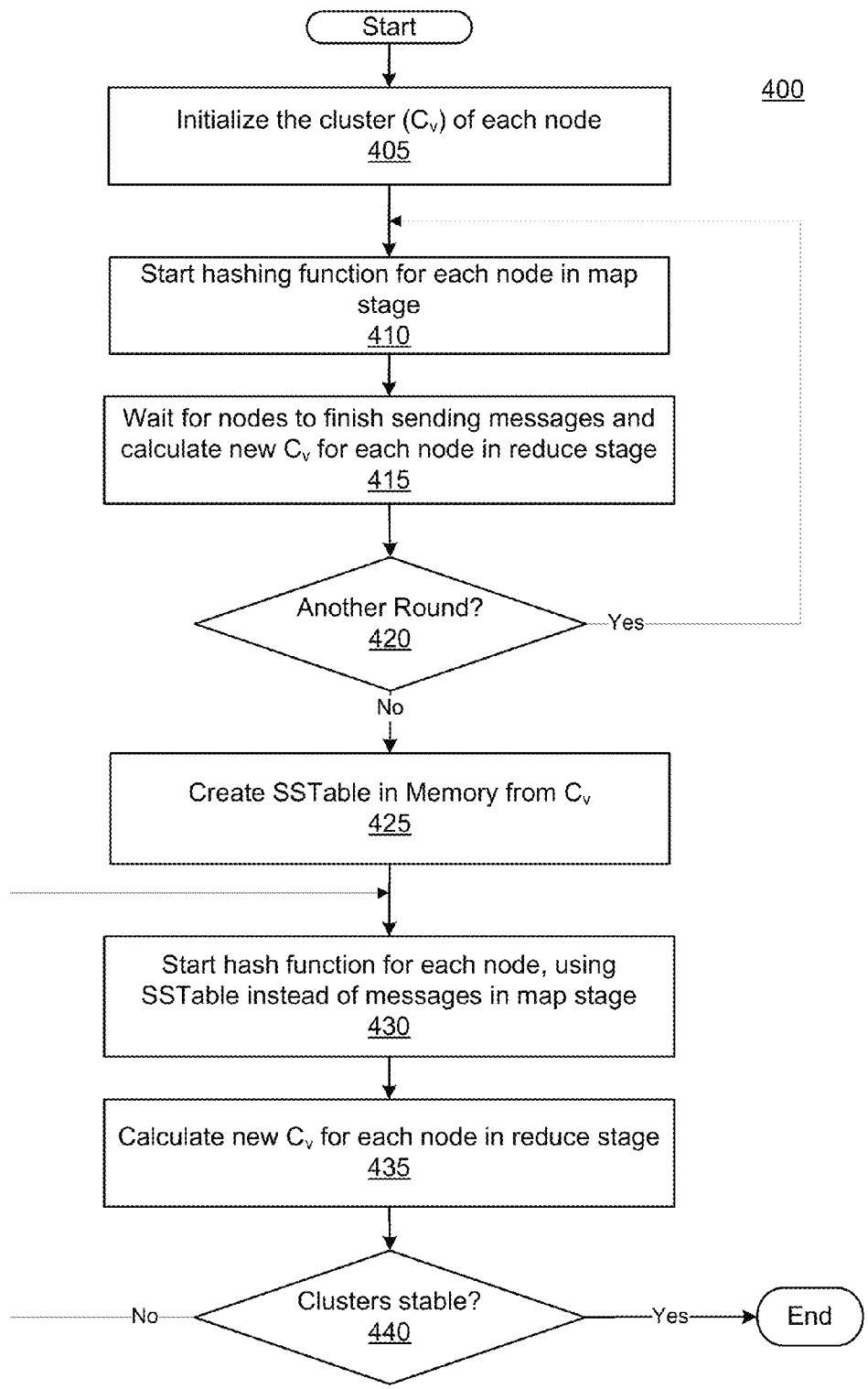
FIG. 4 illustrates a flow diagram of an example of another process for computing connected components of a large distributed graph.

FIG. 4 illustrates a flow diagram of an example of another process 400 for computing connected components of a large distributed graph. The process 400 shown in FIG. 4 may be performed by a graph system distributed across multiple computing devices, such as graph system 100 of FIG. 1. The process 400 may speed the calculation of connected components in a distributed graph by using an in-memory table to resolve cluster mapping and reduce the messages sent. A root, such as root 120, may initiate process 400 to determine which cluster the nodes belong to. Process 400 may be used as an alternative to process 300. The process may begin with the system initializing the cluster $C_v$ for each node in the graph (405). The initialization of $C_v$ may depend on the hashing function used in the map stage of the Map-Reduce. For example, if a Hash-To-Min function is used, $C_v$ may be initialized to the set of V and the neighbors of V. For example, in the graph of FIG. 2, the system initializes $C_F$ to {F, G, H, I}, $C_G$ to {F, G}, $C_I$ to {F, I, H}, and $C_H$ to {F, I, H}.

The system may then start a round of Map-Reduce by performing the hashing function in each node (410). The hashing function may be the Hash-to-Min function that emits ($V_{min}$, $C_v$) and (U, {$V_{min}$}) for all nodes U∈$C_v$. The reducer nodes may calculate their new $C_v$ and all nodes may wait for the remaining nodes to finish the round (420). The system may perform the Map-Reduce rounds a predetermined quantity of times. If the system has not completed the predetermined number of rounds (420, Yes), steps 410 through 420 may be repeated until the system has completed the predetermined number of rounds. In some implementations the predetermined can be as low as two.

When the predetermined number of rounds are complete (420, No), the system may create a table in memory to hold the active cluster identifiers, identified in $C_v$ for each node V. The active cluster identifiers are those identifiers left in the set represented by $C_v$ for each V in the graph. After the predetermined quantity of rounds, many of the potential cluster identifiers have fallen out of the set and the remaining identifiers are small enough to transfer to a memory table. The remaining identifiers may be referred to as active clusters or potential clusters.

In some implementations the table may be an SSTable. An SSTable is a file format that stores immutable string-to-string maps. SSTable data is sorted in ascending order by its keys and can have multiple values for a single key. The SSTable can be sharded, or divided into multiple files. The table may also be a Bigtable or some other type of data structure that maps nodes with potential cluster identifiers. The system may generate one or more entries in the table for each $C_v$. For example, the system may create one entry for each current member of $C_v$. Thus, For example, after two rounds the nodes in cluster 215 of FIG. 2 may have the following states: $C_J$={J, K, L, M}, $C_K$={J, K, L, M}, $C_L$={J} and $C_M$={J}. Accordingly, in step 425 the system may create the following table:

| Node (e.g., V) | $C_V$ Members |
| --- | --- |
| J | J |
| J | K |
| J | L |
| J | M |
| K | J |
| K | K |
| K | L |
| K | M |
| L | J |
| M | J |

The system may then perform the hash function using the table instead of sending messages between nodes. Eliminating the messaging speeds the calculation by eliminating delay due to slow nodes, crashed nodes, or network communication conditions. In some implementations, the table may be stored on the root, such as SSTable 144 of FIG. 1. The system may continue simulating Map-Reduce rounds (430) and (435) using the table rather than sending messages. Once the clusters are stable, the cluster a node belongs to may be determined from the table and, in some implementations, may be stored as an attribute of the node.

The processes described above may be used with additional parameters. For example, in considering what nodes are neighbor nodes, the system may consider only edges in the graph that meet certain criteria. This will, of course, result in a higher number of clusters, or connected components, for the graph. Other such parameters may be used in conjunction with this disclosure.

FIG. 5 shows an example of pseudo-code for a general Map-Reduce function that can be used to alternate the algorithm used in Map-Reduce rounds. The algorithm can be a Hash-to-Min, Hash-Greater-to-Min, or Hash-Lesser-to-Min, as discussed above.

Optimizing Through Load-Balancing

Figure 6:
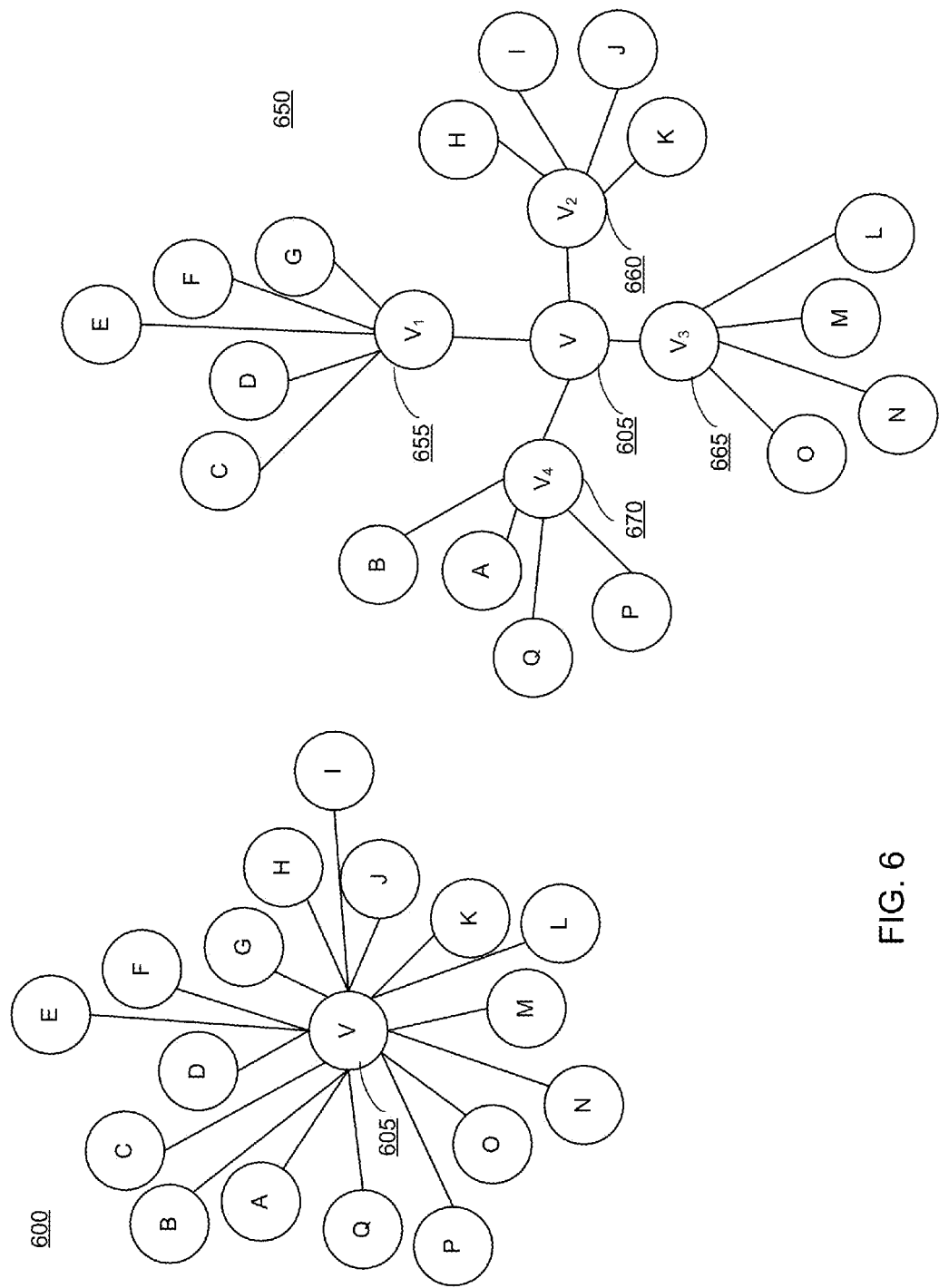
FIG. 6 illustrates a star graph with a root node having high connectivity and a load-balanced version of the star graph, according to an implementation.

Many real-world large data graphs exhibit non-uniform distributions. For example, some nodes may have a high degree of connectivity compared to other nodes, such as a root node in a star graph. The root node of a star graph 600 is illustrated as node 605 of FIG. 6. The implementations described above result in a star graph for each connected component, with the node having the lowest label as the root of each star. In other words, in the final stages, the reducer corresponding to the node with the lowest label will receive the entire connected component, which can cause a single machine to be a bottleneck.

In some implementations, computing the connected components may be optimized by load balancing, ensuring that a reducer looks at a bounded number of pairs independent of the size of the largest connected component during application of the hash-greater-to-min hashing function. In other words, load balancing may occur during the first round (e.g., the hash-greater-to-min round) of the alternating rounds of Map-Reduce. The bounded number of pairs may be represented by b. Thus, b represents the bounded limit. The set of nodes in a neighborhood for node V may be represented by Γ(V). During the map phase of the first round of alternating hash functions (e.g., during the hash-greater-to-min round), the system may determine whether the node is a root node. A node may be marked as a root node in the reduce phase, so the first time the map phase is run, no node is marked as a root node. If the node is a root node, the system may emit its identifier (or state) to it's neighbors Γ(V). Because it is a root, it is by definition the node with the smallest identifier (e.g., $V_{min}$).

If the node V is not a root node, is not a copy of a root node, and the number of nodes in its neighborhood |Γ(V)| is greater than the bounded limit, the system may make copies of the node V. In some implementations, the quantity of copies is equal to the bounded limit b. The neighboring nodes of V may be assigned to one of the copies of V. For example, if b is 4, the star graph 600 of FIG. 6 becomes the star graph 650 of FIG. 6, with nodes 655, 660, 665, and 670 being copies of node 605. In some implementations a hash may be used to assign the neighbors to one of the copies, e.g. a hash of the node identifier. Thus, the neighboring nodes are generally distributed equally amongst the copies. Each copy may be assigned an identifier or label that is based on the identifier (or label) of node V, but differs in an infinitesimally small way. For example, if node V has a label of $1_V$ and i∈{1, 2, 3, . . . b) so that there are 1-b copies of node V, the $i^{th}$ copy V may have a label of $1_V+(i*\epsilon)$ where $\epsilon$ is greater than zero but infinitesimally small so that $i*\epsilon$ is not greater than one. Thus, the copies of V are in the set of nodes that are greater than V. The system may then connect V to each of its copies (e.g., by sending a message from V to each $V_i$ where i∈{1, 2, 3, . . . b) that includes V), and may send a message from each $V_i$ to the nodes U that are associated with the copy.

If the node does not fall under neither of the two checks above, the system emits ($V_{min}$,U), where the node U is in the neighborhood of V.

During the corresponding reduce phase of this optimized, load balanced round, at each node the system may check to see if the node has the smallest identifier of the neighborhood. If it does, the node is marked as a root node. The system may then send a message to all nodes in the neighborhood greater than V with $V_{min}$ (e.g., the node with the smallest label).

Performance Evaluation

Processing times for computing connected components using various implementations described above were evaluated and found to be much faster than using Hash-to-Min alone. Graphs of various sizes were used in the evaluation. The size of the graphs tested appear in Table 1 below (all social network sub-graphs were anonymized, and the connectivity in the sub-graphs does not reflect on the general connectivity in the complete graph):

TABLE 1

| Network | Number of Nodes | Number of Edges |
| --- | --- | --- |
| LiveJournal Authorship | 4,847,571 | 68,993,773 |
| Friendster Friendship | 65,608,366 | 1,806,067,135 |
| Patent Citation | 3,774,768 | 16,518,948 |
| TWITTER followership | 35,689,148 | 41,652,230 |
| UK web subgraph | 105,896,555 | 6,603,753,128 |
| GOOGLE+ subgraph | 177,878,516 | 2,917,041,952 |
| Orkut social subgraph | 157,546,418 | 17,474,363,130 |
| Image similarity subgraph | 145,406,617 | 3,865,659,506 |
| Keyword similarity subgraph | 371,441,631 | 3,514,501,483 |

Figure 7:
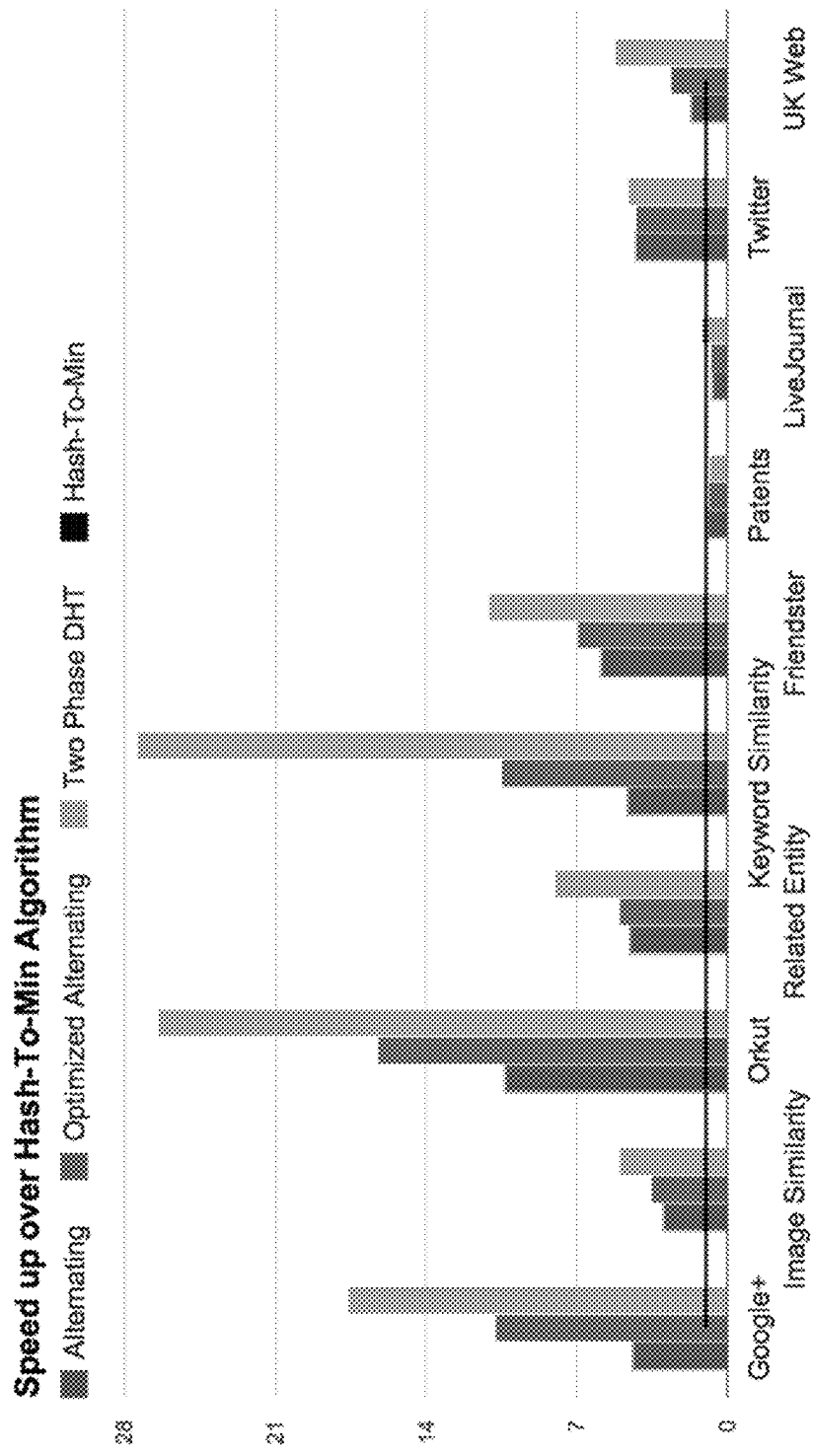
FIG. 7 illustrates processing time enhancements that result from various implementations used to compute connected components on various real-world graphs.

FIG. 7 illustrates the gains in processing time observed for the various implementations across the various graphs. The gains are over the hash-to-min algorithm. The Optimized Alternating uses the load balancing during the first round of the alternating rounds, as described above. The two phase DHT uses the in-memory table, also as described above. As illustrated, all implementations see significant decreases in processing times to compute connected components over hash-to-min alone, with the in-memory table implementation (Two Phase DHT) processing the connected components almost 30 times faster on very large graphs. In terms of absolute running time, for some big graphs, the actual running time went down from more than a day to a couple of hours, or from a few hours to ten minutes, when running over several hundreds of machines.

To test the scalability of implementations, seven RMAT graphs were generated. RMAT is a recursive model of randomly generating a graph with several desirable properties such as power-law degree distribution property, small world property, and inclusion of many dense bipartite subgraphs. To generate an RMAT graph, one recursively subdivides the adjacency matrix in four equal quadrants and elects to recurse on one of the four quadrants with unequal probability (a, b, c, or d). The seven graphs were generated from this family with $2^{22}$, $2^{26}$, . . . , $2^{34}$ nodes by setting the parameters ((a, b, c, d)=(0.57, 0.19, 0.19, 0.05). The size of the seven RMAT graphs is illustrated in Table 2 below:

TABLE 2

| | Number of Nodes | Number of Edges |
| --- | --- | --- |
| RMAT $2^{22}$ | 2,396,986 | 128,311,950 |
| RMAT $2^{24}$ | 8.871,645 | 520,757,402 |
| RMAT $2^{26}$ | 32,803,311 | 2,103,850,648 |
| RMAT $2^{28}$ | 121,228,778 | 8,472,338,793 |
| RMAT $2^{30}$ | 447,774,395 | 34,044,283,063 |
| RMAT $2^{32}$ | 1,652,692,682 | 136,596,059,559 |
| RMAT $2^{34}$ | 6,097,235,142 | 547,511,932,254 |

The hash-to-min algorithm and various implementations were used to compute connected components on the seven RMAT graphs. Table 3 below shows the number of Map-Reduce rounds used by each implementation and the hash-to-min. On the two largest graphs, hash-to-min failed to finish in more than a day, so the run was terminated before completion.

TABLE 3

| | Hash-to-Min | Alternating | Optimized Alternating | Two Phase DHT |
| --- | --- | --- | --- | --- |
| RMAT $2^{22}$ | 5 | 5 | 6 | 2 |
| RMAT $2^{24}$ | 5 | 6 | 6 | 2 |
| RMAT $2^{26}$ | 5 | 6 | 6 | 2 |
| RMAT $2^{28}$ | 6 | 6 | 7 | 2 |
| RMAT $2^{30}$ | — | 6 | 7 | 2 |
| RMAT $2^{32}$ | — | 6 | 7 | 2 |

Figure 8:
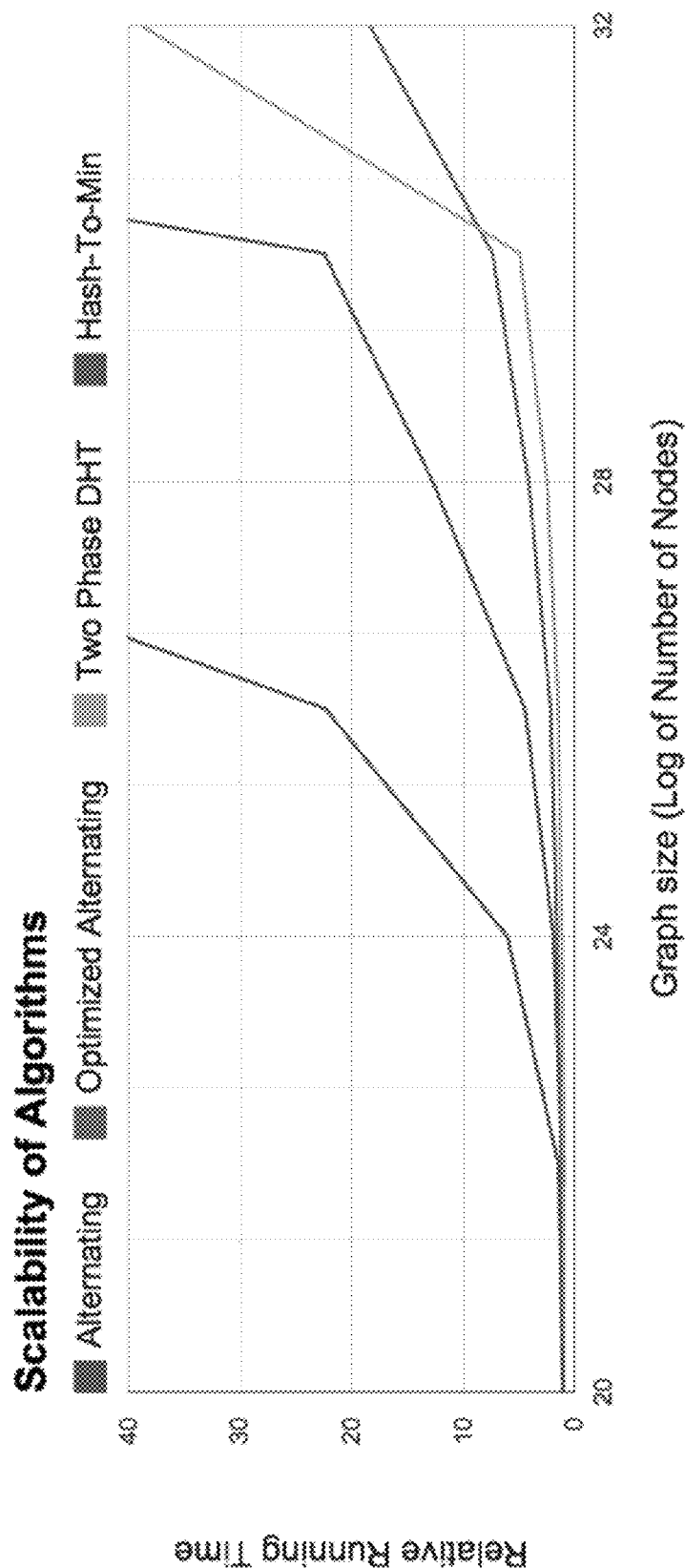
FIG. 8 illustrates scalability of various implementations on graphs of various sizes.

Table 3 illustrates that even as the graphs get larger, the number of rounds do not significantly change, and stay much lower than O(log 2 n). However, while the number of rounds stays the same, the time per round changes dramatically. FIG. 8 illustrates the running time versus the log of the number of vertices. As illustrated in FIG. 8, the hash-to-min algorithm has a fast-growing running time, which is why the algorithm did not finish in a day for the larger graphs. Also as illustrated, the various implementations have slower-growing running times, with the optimized alternating (e.g., load balancing), having the most reduced running time because this implementation breaks up high degree nodes.

Figure 9:
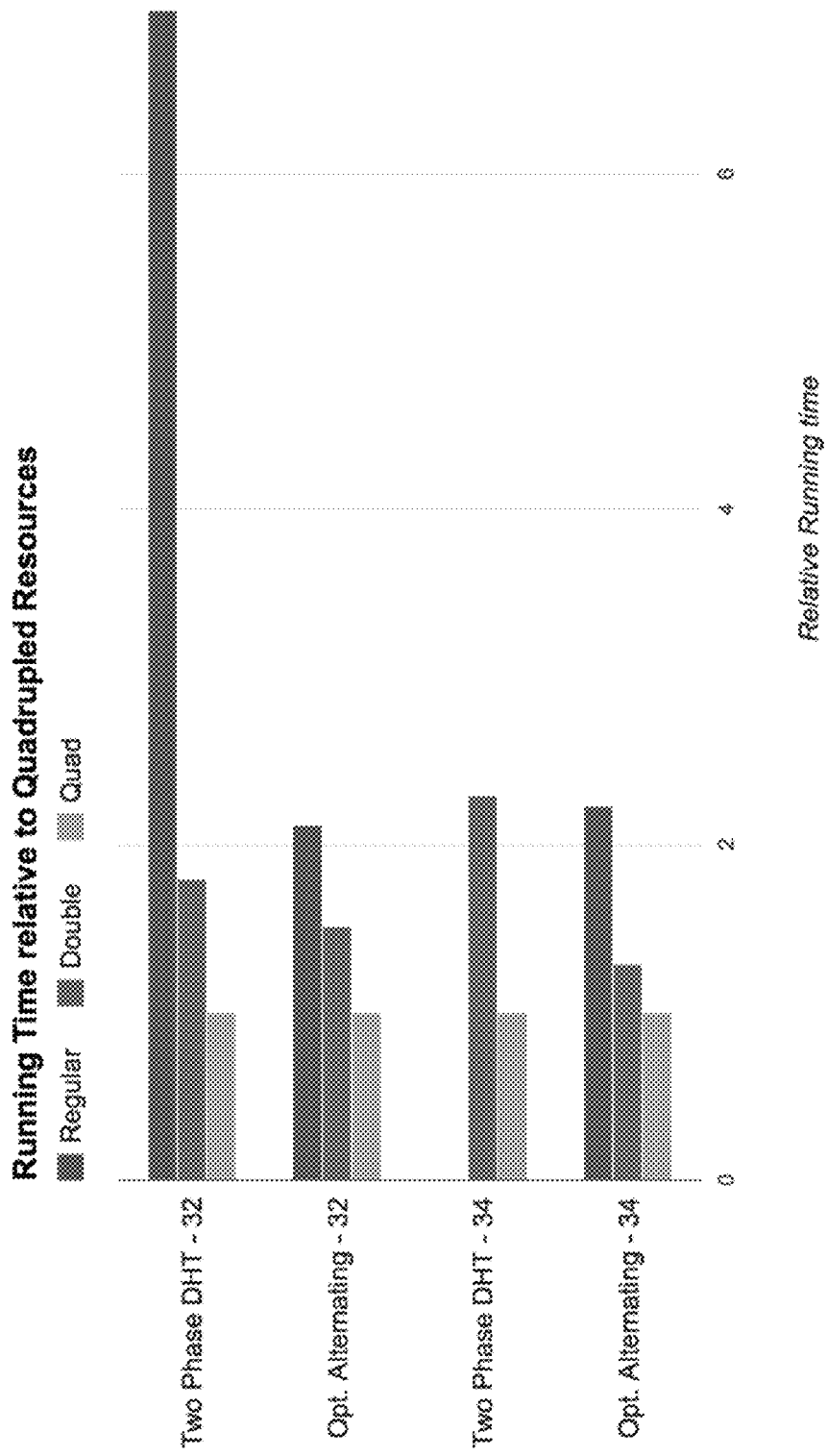
FIG. 9 demonstrates the efficiency of various implementations as resources are added.

FIG. 9 demonstrates the performance of various implementations in relation to the number of resources (cores) available. The graph of FIG. 9 plots the relative running times of each approach on the two largest RMAT graphs, RMAT $3^{32}$ and RMAT $2^{34}$. A perfectly work efficient algorithm would take twice as much time when the number of resources are halved and three times as much time when the number of resources are reduced by a factor of three.

FIG. 9 illustrates that disclosed implementations are for the most part work efficient. One exception comes from computing large graphs on small resources; here the slow down is nonlinear due to machines getting overwhelmed. For example, the in-memory implementation (Two-Phase DHT) does not finish on the regular number of resources on the largest RMAT graph because of the in-memory table getting overwhelmed. Thus FIG. 9 illustrates only two of the three bars for the Two-Phase DHT implementation.

Figure 10:
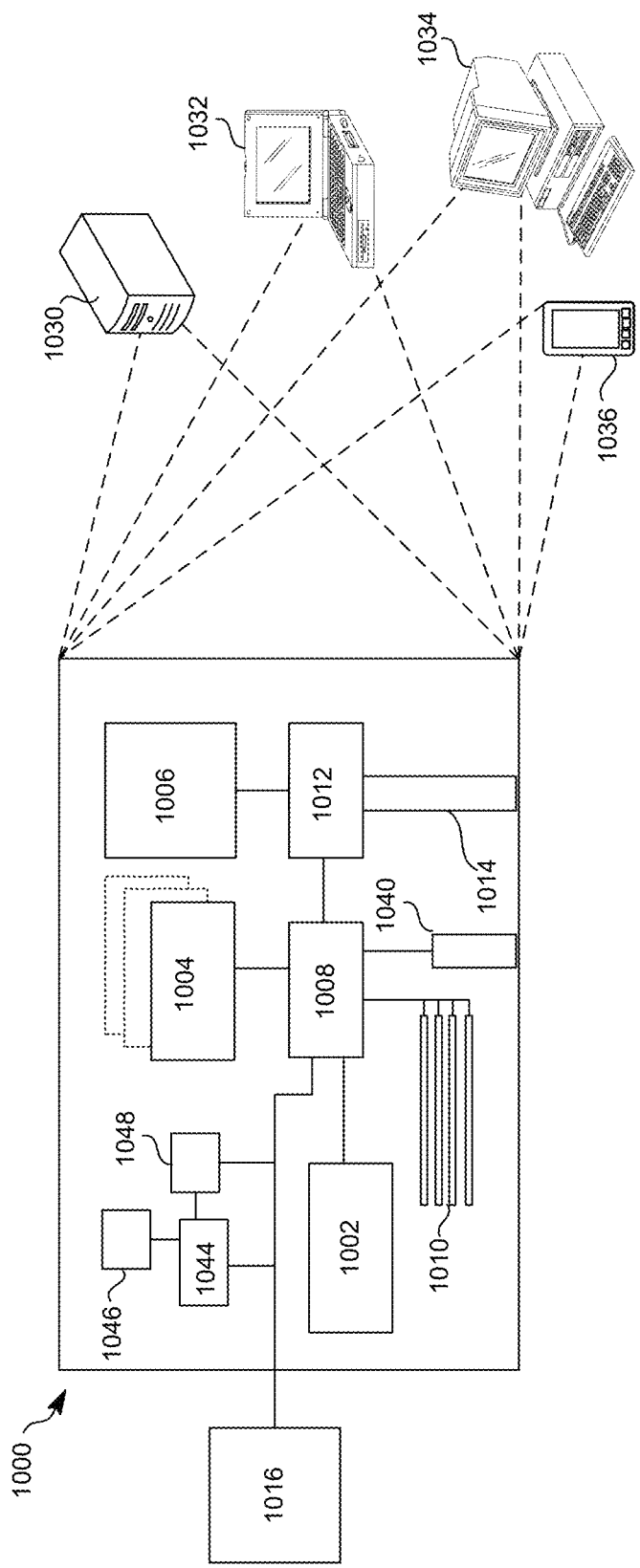
FIG. 10 shows an example of a computer device that can be used to implement the described techniques.

FIG. 10 shows an example of a generic computer device 1000, which may be system 100 or client 170 of FIG. 1, which may be used with the techniques described here. Computing device 1000 is intended to represent various example forms of computing devices, such as laptops, desktops, workstations, personal digital assistants, cellular telephones, smart phones, tablets, servers, and other computing devices, including wearable devices The components shown here, their connections and relationships, and their functions, are meant to be exemplary only, and are not meant to limit implementations of the inventions described and/or claimed in this document.

Computing device 1000 includes a hardware (e.g., silicone-based) processor 1002, memory 1004, a storage device 1006, and expansion ports 1010 connected via an interface 1008. In some implementations, computing device 1000 may include transceiver 1046, communication interface 1044, and a GPS (Global Positioning System) receiver module 1048, among other components, connected via interface 1008. Device 1000 may communicate wirelessly through communication interface 1044, which may include digital signal processing circuitry where necessary. Each of the components 1002, 1004, 1006, 1008, 1010, 1040, 1044, 1046, and 1048 may be mounted on a common motherboard or in other manners as appropriate.

The processor 1002 can process instructions for execution within the computing device 1000, including instructions stored in the memory 1004 or on the storage device 1006 to display graphical information for a GUI on an external input/output device, such as display 1016. Display 1016 may be a monitor or a flat touchscreen display. In some implementations, multiple processors and/or multiple buses may be used, as appropriate, along with multiple memories and types of memory. Also, multiple computing devices 1000 may be connected, with each device providing portions of the necessary operations (e.g., as a server bank, a group of blade servers, or a multi-processor system).

The memory 1004 stores information within the computing device 1000. In one implementation, the memory 1004 is a volatile memory unit or units. In another implementation, the memory 1004 is a non-volatile memory unit or units. The memory 1004 may also be another form of computer-readable medium, such as a magnetic or optical disk. In some implementations, the memory 1004 may include expansion memory provided through an expansion interface.

The storage device 1006 is capable of providing mass storage for the computing device 1000. In one implementation, the storage device 1006 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in such a computer-readable medium. The computer program product may also contain instructions that, when executed, perform one or more methods, such as those described above. The computer- or machine-readable medium is a storage device such as the memory 1004, the storage device 1006, or memory on processor 1002.

The interface 1008 may be a high speed controller that manages bandwidth-intensive operations for the computing device 1000 or a low speed controller that manages lower bandwidth-intensive operations, or a combination of such controllers. An external interface 1040 may be provided so as to enable near area communication of device 1000 with other devices. In some implementations, controller 1008 may be coupled to storage device 1006 and expansion port 1014. The expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1000 may be implemented in a number of different forms, as shown in the figure. For example, it may be implemented as a standard server 1030, or multiple times in a group of such servers. It may also be implemented as part of a rack server system. In addition, it may be implemented in a personal computer such as a laptop computer 1022, or smart phone 1036. An entire system may be made up of multiple computing devices 1000 communicating with each other. Other configurations are possible.

FIG. 8 shows an example of a generic computer device 1100, which may be system 100 of FIG. 1, which may be used with the techniques described here. Computing device 1100 is intended to represent various example forms of large-scale data processing devices, such as servers, blade servers, datacenters, mainframes, and other large-scale computing devices. Computing device 1100 may be a distributed system having multiple processors, possibly including network attached storage nodes, that are interconnected by one or more communication networks. The components shown here, their connections and relationships, and their functions, are meant to be exemplary only, and are not meant to limit implementations of the inventions described and/or claimed in this document.

Distributed computing system 1100 may include any number of computing devices 1180. Computing devices 1180 may include a server or rack servers, mainframes, etc. communicating over a local or wide-area network, dedicated optical links, modems, bridges, routers, switches, wired or wireless networks, etc.

In some implementations, each computing device may include multiple racks. For example, computing device 1180a includes multiple racks 1158a-1158n. Each rack may include one or more processors, such as processors 1152a-1152n and 1162a-1162n. The processors may include data processors, network attached storage devices, and other computer controlled devices. In some implementations, one processor may operate as a master processor and control the scheduling and data distribution tasks. Processors may be interconnected through one or more rack switches 1158, and one or more racks may be connected through switch 1178. Switch 1178 may handle communications between multiple connected computing devices 1100.

Each rack may include memory, such as memory 1154 and memory 1164, and storage, such as 1156 and 1166. Storage 1156 and 1166 may provide mass storage and may include volatile or non-volatile storage, such as network-attached disks, floppy disks, hard disks, optical disks, tapes, flash memory or other similar solid state memory devices, or an array of devices, including devices in a storage area network or other configurations. Storage 1156 or 1166 may be shared between multiple processors, multiple racks, or multiple computing devices and may include a computer-readable medium storing instructions executable by one or more of the processors. Memory 1154 and 1164 may include, e.g., volatile memory unit or units, a non-volatile memory unit or units, and/or other forms of computer-readable media, such as a magnetic or optical disks, flash memory, cache, Random Access Memory (RAM), Read Only Memory (ROM), and combinations thereof. Memory, such as memory 1154 may also be shared between processors 1152a-1152n. Data structures, such as an index, may be stored, for example, across storage 1156 and memory 1154. Computing device 1100 may include other components not shown, such as controllers, buses, input/output devices, communications modules, etc.

An entire system, such as system 100, may be made up of multiple computing devices 1100 communicating with each other. For example, device 1180a may communicate with devices 1180b, 1180c, and 1180d, and these may collectively be known as system 100. As another example, system 100 of FIG. 1 may include one or more computing devices 1100 as graph system 100, a separate computing device 1100 as root 120, and one or more computing devices 1100 as graph cluster 160. Furthermore, some of the computing devices may be located geographically close to each other, and others may be located geographically distant. The layout of system 1100 is an example only and the system may take on other layouts or configurations.

Various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any non-transitory computer program product, apparatus and/or device (e.g., magnetic discs, optical disks, memory (including Read Access Memory), Programmable Logic Devices (PLDs)) used to provide machine instructions and/or data to a programmable processor but not to transitory signals.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, various modifications may be made without departing from the spirit and scope of the invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A system comprising:
   distributed computing devices;
   memory storing a graph of nodes and edges, the graph being distributed across the computing devices; and
   at least one root computing device that includes:
   at least one processor, and
   memory storing instructions that, when executed by the at least one processor, cause the system to determine connected components for the graph by performing rounds of a map stage and a reduce stage for the nodes of the graph, wherein the map stage alternates between two hashing functions.

2. The system of claim 1 wherein a Hash-Greater-to-Min hashing function is alternated with a Hash-Lesser-to-Min hashing function.

3. The system of claim 1 wherein a first hashing function of the two hashing functions is a Hash-Greater-to-Min hashing function that emits ($V_{min}$, $C_{>V}$) and (U, $\{V_{min}\}$) for nodes U in the set of $C_{>V}$.

4. The system of claim 3 wherein a second hashing function of the two hashing functions is a Hash-Lesser-to-Min hashing function that emits ($V_{min}$, $C_{<V}$) and (U, for nodes U in the set of $C_{<V}$.

5. The system of claim 1 wherein the graph includes more than one billion nodes.

6. The system of claim 1 further comprising a state for a first node of the nodes, the state including a set of possible cluster identifiers, and wherein a first hashing function of the two hashing function includes:
   determining a minimum cluster identifier in the set of possible cluster identifiers;
   determining a first subset of the cluster identifiers;
   sending a message with the minimum cluster identifier to nodes corresponding to the first subset; and
   sending a message that includes the first subset of the cluster identifiers to a node of the nodes associated with the minimum cluster identifier.

7. The system of claim 6 wherein a second hashing function of the two hashing function includes:
   determining minimum cluster identifier in the set of possible cluster identifiers;
   determining a second subset of the cluster identifiers, the second subset including the cluster identifiers not included in the first subset;
   sending a message with the minimum cluster identifier to nodes corresponding to the second subset; and
   sending a message that includes the second subset of the cluster identifiers to a node of the nodes associated with the minimum cluster identifier.

8. The system of claim 1, wherein determining connected components includes load balancing nodes with a neighborhood size larger than a bounded limit during a first of the two hashing functions.

9. A method comprising:
reducing processing time during map-reduce rounds when determining a cluster assignment for a node in a large distributed graph, a map-reduce round of the map-reduce rounds including a map stage and a reduce stage, the processing time being reduced by alternating between two hashing functions in the map stage; and
storing the cluster assignment for the node in a memory.

10. The method of claim 9, wherein a first of the two hashing functions is a Hash-Greater-to-Min hashing function and a second of the two hashing functions is a Hash-Lesser-to-Min hashing function.

11. The method of claim 9, wherein the distributed graph includes more than one billion nodes.

12. The method of claim 9, further comprising load balancing nodes with a neighborhood size larger than a bounded limit during a first of the two hashing functions.

13. A method comprising:
reducing a quantity of messages sent during map-reduce rounds used to determine a cluster assignment for a node in a large distributed graph by:
performing a predetermined quantity of rounds to generate, for each node, a set of potential cluster assignments,
generating a data structure in memory to store a mapping between each node and its potential cluster assignment, and
using the data structure during remaining map-reduce rounds, wherein the remaining map-reduce rounds do not send messages between nodes; and
storing the cluster assignment for the node in a memory.

14. The method of claim 13, wherein the map-reduce rounds include a map stage that uses a Hash-to-Min hashing function.

15. The method of claim 13, wherein the graph includes more than one billion nodes.

16. The method of claim 13, wherein the data structure is a table that stores immutable string-to-string maps.

17. A system comprising:
distributed computing devices represented by leaf servers;
memory storing a graph of nodes and edges, the graph being distributed across the leaf servers; and
at least one root computing device that includes:
at least one processor, and
memory storing instructions that, when executed by the at least one processor, cause the system to determine connected components for the graph by:
performing a predetermined number of rounds of a map stage and a reduce stage for the nodes of the graph, the map stage causing messages to be sent between the leaf servers, and wherein performing the predetermined number of rounds generates a set of potential clusters for each node,
generating a data structure in memory to store a mapping between each node and its set of potential clusters, and
using the data structure during remaining rounds of the map stages and the reduce stages, wherein no messages are sent between the leaf servers during the remaining rounds.

18. The system of claim 17 wherein the data structure is a table that stores immutable string-to-string maps.

19. The system of claim 17 wherein the map stage uses a Hash-to-Min hashing function.

20. The system of claim 17 wherein the graph includes more than one billion nodes.

* * * * *

UNITED STATES PATENT AND TRADEMARK OFFICE
CERTIFICATE OF CORRECTION

PATENT NO. : 9,596,295 B2
APPLICATION NO. : 14/143894
DATED : March 14, 2017
INVENTOR(S) : Banadaki et al.

Page 1 of 1

It is certified that error appears in the above-identified patent and that said Letters Patent is hereby corrected as shown below:

On the Title Page

On Page 2, Column 2, item (56), under "OTHER PUBLICATIONS", Line 4, delete "Lmemational" and insert --International--, therefor.

In the Claims

In Column 14, Line 32, Claim 3, delete "(U, $\{V_{min}\}$)for" and insert --(U, $\{V_{min}\}$) for--, therefor.

In Column 14, Lines 36-37, Claim 4, delete "($V_{min}$, C<v) and (U, for nodes U in the set of C<v." and insert --($V_{min}$, C≤v) and (U,$\{V_{min}\}$) for nodes U in the set of C≤v.--, therefor.

Signed and Sealed this
Seventeenth Day of December, 2019

Andrei Iancu
*Director of the United States Patent and Trademark Office*